United States Patent [19]
Bach et al.

[11] Patent Number: 5,151,179
[45] Date of Patent: Sep. 29, 1992

[54] FAUCET CONNECTED WATER FILTER

[75] Inventors: Ulf-Eiel F. Bach, Mound; Rodney N. Rueter; John N. Taylor, both of St. Louis Park, all of Minn.

[73] Assignee: Northland Aluminum Products, Inc., Minneapolis, Minn.

[21] Appl. No.: 871,140

[22] Filed: Apr. 20, 1992

[51] Int. Cl.$^5$ ............... B01D 35/02; B01D 35/30
[52] U.S. Cl. ................... 210/250; 210/282; 210/443; 210/446; 210/449
[58] Field of Search ............... 210/282, 266, 440, 444, 210/449, 445, 435, 249, 250, 232, 238, 446

[56] References Cited

U.S. PATENT DOCUMENTS

| | | | |
|---|---|---|---|
| 776,550 | 12/1904 | Rice | 210/249 |
| 1,202,370 | 10/1916 | Egle et al. | 210/449 |
| 1,294,164 | 2/1919 | Ramsey | 210/449 |
| 1,611,872 | 12/1926 | Ballentine | 210/449 |
| 2,088,116 | 7/1937 | Ramsey | 210/87 |
| 3,853,761 | 12/1974 | McClory | 210/449 |
| 4,147,631 | 4/1979 | Deines et al. | 210/282 |
| 4,172,796 | 10/1979 | Corder | 210/282 |
| 4,504,389 | 3/1985 | Rundzaitis | 210/282 |
| 4,686,037 | 8/1987 | Lang | 210/449 |
| 4,770,768 | 9/1988 | Lang | 210/282 |
| 4,980,073 | 12/1990 | Woodruff | 210/767 |
| 5,017,286 | 5/1991 | Heiligman | 210/282 |

*Primary Examiner*—Stanley S. Silverman
*Assistant Examiner*—Cynthia L. Nessler
*Attorney, Agent, or Firm*—Haugen and Nikolai

[57] ABSTRACT

A faucet mounted water filtration unit having two tubular hollow legs depending from a base member with a coupler for attaching the unit to a faucet spout, with the spout straddled by the legs and the unit positioned about the faucet. One leg brings unfiltered water from the faucet spout attachment into the filter housing containing a replaceable cartridge. The other tubular leg brings filtered water from the filter unit to an outlet port. A diverter valve on the base allows one to bypass the filter unit to receive unfiltered water.

7 Claims, 2 Drawing Sheets

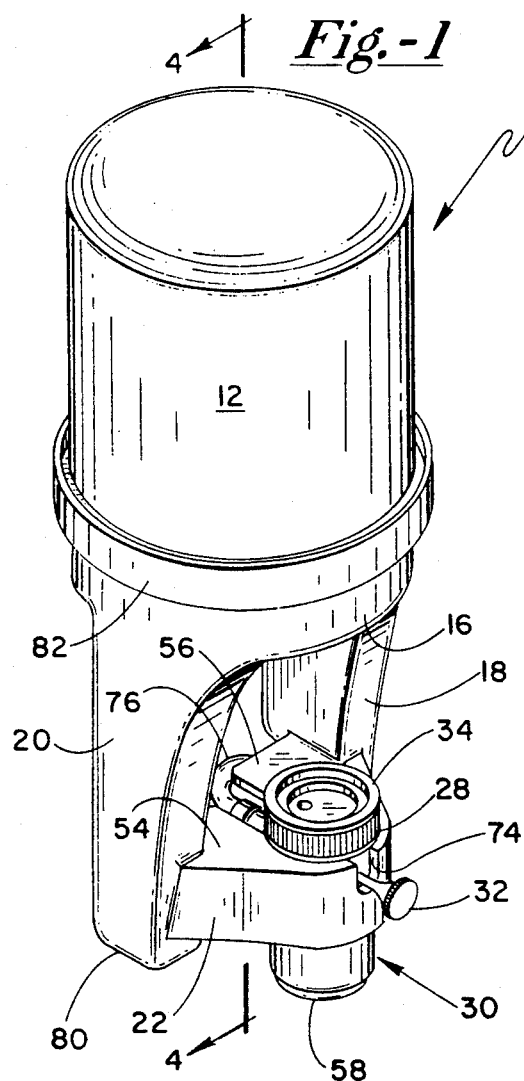
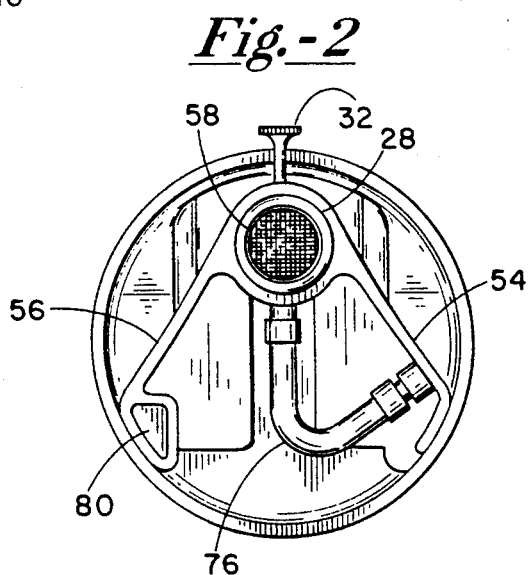
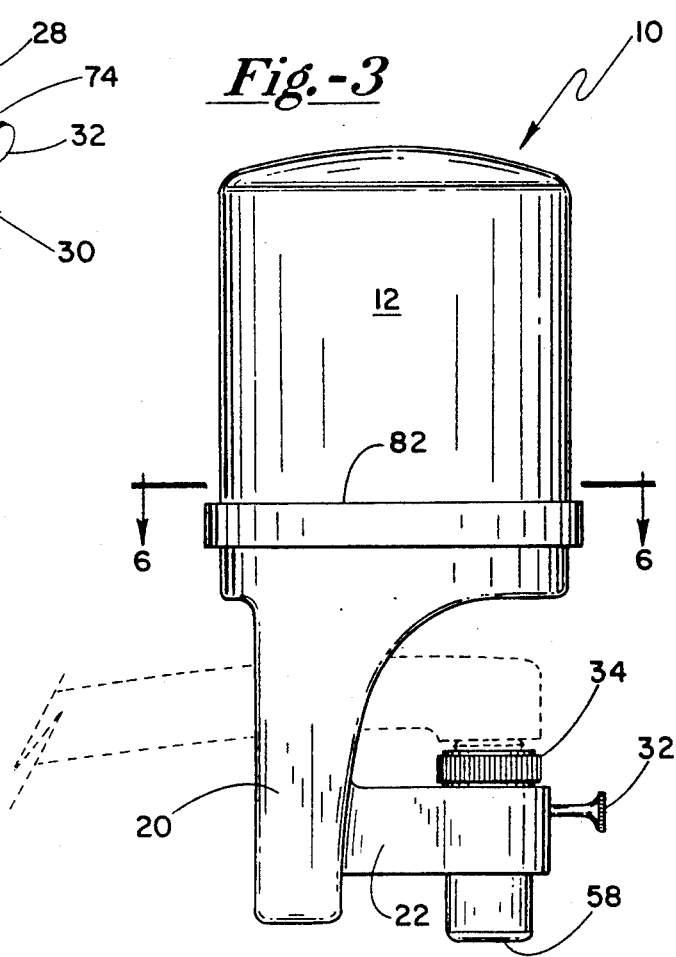

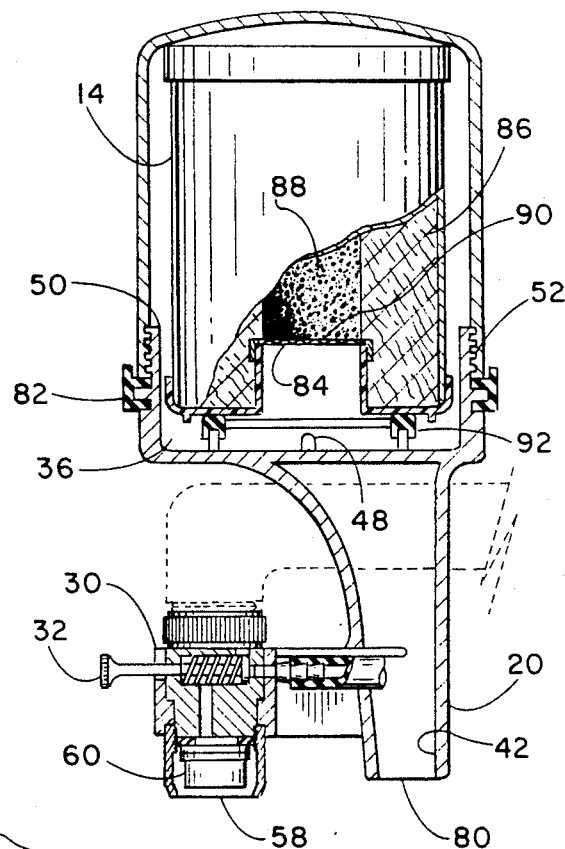
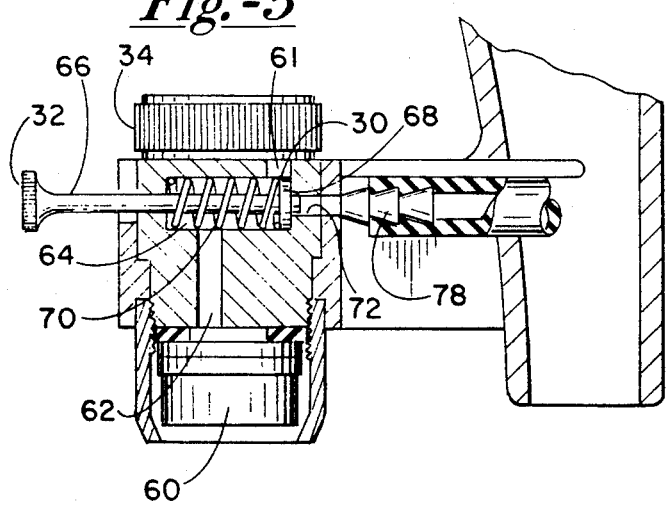
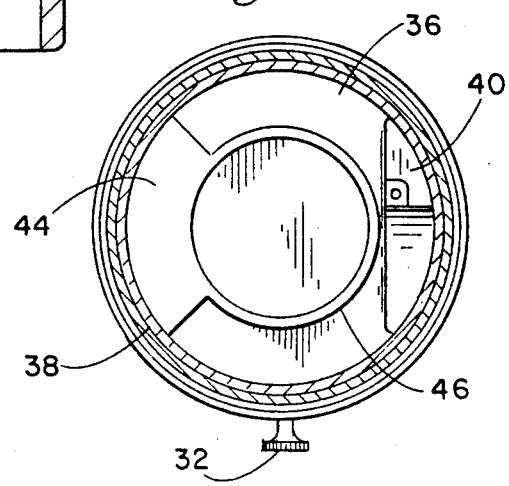

FAUCET CONNECTED WATER FILTER

BACKGROUND OF THE INVENTION

I. Field of the Invention

The present invention relates to water filter devices. More particularly, it relates to a water filter for home use that attaches directly to a faucet.

II. Discussion of the Prior Art

A variety of water filters are known in the art. Water filters used in homes include large, beneath-the-sink filter units that are plumbed into the pipes leading to one or more faucets and filter units that individually attach directly to the faucet. The prior art filter devices take up precious space in the cabinets located below the sink. Filter devices are also known which are located on a counter adjacent to the sink and attached to the faucet by way of a tube. This is wasteful of counter space.

In an attempt to increase counter and cabinet space, water filter designs that attach directly to the faucet have been the subject of many prior art patents. Filters that attach directly to the faucet generally consist of an elongated base having a faucet spout and a filter housing. The user is allowed to choose between filtered or unfiltered water by use of a switch which operates a valve. The unfiltered water generally exits through the base, directly beneath the faucet, and the filtered water outlet is located underneath the filter housing. However, these types of faucet filter arrangements also take up unnecessary space beneath the faucet and limit the size of the pan or other vessel that is to be filled.

A need exists for a filter arrangement that does not take up space beneath, in front of or along the sides of the faucet area. None of the various water filter attachments of which we are aware show arrangements in which the filter unit is located directly above the faucet spout. Such an arrangement increases maneuverability and space around the faucet area of the sink to enable one to accomplish tasks such as filling a large container with water or washing large bulky items which require substantial clearance relative to the faucet spout.

Accordingly, it is the object of the present invention to provide a better faucet filter device arrangement by having the filter device straddle the faucet spout with the filter housing directly above a small base to which the faucet spout attaches. This invention still contains the feature of allowing a person to select filtered and unfiltered water. It also has a replaceable filter cartridge.

Another object of the invention is to provide a design which incorporates the water conduits to and from the filter unit within the vertical support structure for the filter housing.

Yet another object of the present invention is to eliminate the bulk from the elongated bases common to known faucet mounted filter units.

SUMMARY OF THE INVENTION

The present invention is a faucet-spout-mounted water filtration device. The filter housing portion has a base member with two downwardly depending legs. The device mounts onto the faucet with its legs straddling the faucet spout but with the filter cartridge housing disposed above the faucet. The base supports a diverter valve which couples to the faucet outlet and contains a filtered water outlet and a dispensing unfiltered water outlet. The diverting valve on the base allows the option of bypassing the filter unit for unfiltered water. In use, when the diverter valve is operated to a first position, unfiltered water flows up one of the legs into the filter housing portion which contains a replaceable filter cartridge. The incoming water flows through the body of the filter cartridge and exits through an outlet port located in the center section of the base of the filter cartridge and is isolated from the incoming unfiltered water. To exit the filter, the water flows through the second leg of the base member to its open bottom end. An annular gasket located within the filter housing provides the isolation which prevents the filtered and unfiltered water from mixing.

The foregoing features and advantages of the invention will become apparent to those skilled in the art from the following detailed description of the present invention, in which like numerals in the views correspond to parts.

IN THE DRAWINGS

FIG. 1 is a perspective view of the invention;

FIG. 2 is a bottom elevational view of the invention;

FIG. 3 is a side elevational view of the invention with the faucet spout shown in phantom line;

FIG. 4 is a view taken along section 4—4 of FIG. 1;

FIG. 5 is an enlarged view of the cylindrical socket and diverter valve shown in FIG. 4; and FIG. 6 is a view taken along section 6—6 of FIG. 3.

DESCRIPTION OF THE PREFERRED EMBODIMENT

Referring first to FIGS. 1 and 4, there is depicted a perspective view showing the general configuration of the faucet mounted filter comprising the present invention and a cross-section thereof, respectively. It is indicated generally by numeral 10 and consists generally of a filter cartridge housing 12 in the form of a generally cylindrical shell, containing a filter cartridge 14 and supported by base 16 having two tubular legs 18 and 20 integrally formed and depending therefrom. A diverter valve support 22 is disposed between legs 18 and 20 near their lower ends. The diverter valve support 22 includes a cylindrical socket 28 into which is fitted a diverter valve assembly 30. The diverter valve assembly 30 also has an actuator knob 32 and a knurled, annular, internally threaded faucet spout attachment 34.

As stated above, base 16 has two depending legs 18 and 20. These legs are hollow. One leg, 18, is the water inlet leg and carries unfiltered water to the inlet port in base 16. The other leg, 20, is the filtered water outlet leg and carries filtered water from the outlet port in base 16. As shown in FIG. 6, base 16 has a circular shape with a planar horizontal surface 36 and a rim 38 extending perpendicular to the outer edges of surface 36. The planar surface 36 is partly removed, as shown at 40, thereby connecting the interior of the upper portion of the base with the 15 hollow legs 18 and 20 to allow fluid communication between the upper portion of the base with the hollow legs. The opening 42, the base's filtered water outlet, is isolated from the interior of the upper portion of the base 16 by a covering member 44 which extends from the annular wall 46 to the rim 38. This perpendicularly extending annular wall 46 is located in the center of the planar surface 36. A port 48 formed through the annular wall 46 allows fluid communication between hollow leg 20 and the interior of the annular wall. The opening 40 is the base raw water inlet. The rim 38 has threads 50 for mating with threads 52 on the filter cartridge housing 12.

The diverter valve support 22 has a generally triangular shape when observed from below and is located at the lower ends 24 and 26 of hollow legs 18 and 20. It has a tubular socket 28 formed in it from which the two arms 54 and 56 extend at an angle to connect with the hollow legs' lower ends 24 and 26. Tubular socket 28 is located at the apex of the triangle from which two arms 54 and 56 extend to connect with the lower ends 24 and 26 of the hollow legs. The tubular socket 28 receives the diverter valve assembly 30.

The diverter valve 30 has a threaded ring coupler 34 for attaching it to a threaded faucet spout once the conventional aerator used on most faucets is removed. FIG. 3 shows a faucet spout in phantom line as being attached to the threaded rotatable ring coupler 34.

Located at the other end of the cylindrical socket 28 is the unfiltered water exit 58. An aerator 60 is located within the cylindrical socket 28 adjacent to the unfiltered water exit 58. The diverter valve assembly 30 located in the cylindrical socket 28 has an upper vertical bore 61 which extends from the area surrounded by the ring coupler 34 to a horizontal bore 64 which extends radially across the cylindrical socket. A lower vertical bore 62 extends from the horizontal bore 64 to the unfiltered water outlet 58. The horizontal bore 64 intersects vertical bores 61 and The diverter valve assembly 30 comprises a valve stem 66 having the actuator knob 32 attached to one end and a valve plate member 68 affixed to its opposite end. A compression spring 70 cooperating between the valve plate and a seat at the end wall of bore 64 normally holds the valve plate member closed relative to port 72. When the valve assembly 30 is contained within its socket, the actuator knob 32 is accessible to the operator through slot 74 (FIG. 1).

With reference to FIG. 2, a short length of plastic tubing 76 connects the outlet 72 of the diverter valve 30 with the hollow leg 18 at its lower end 24. More specifically, the outlet port 72 is provided with a barbed coupler 78 for retaining the tube 76 in place once it is fitted over that coupler. The lower end 26 of the hollow leg 20 extends below the diverter valve support 22 and is open at its base 80 for the filtered water to exit.

The diverter valve plate 68 has a first position in which it is retracted against the force of spring 70 to a location in the horizontal bore 64 between the upper bore 61 and the lower vertical bore 62. When in this position, water exiting the faucet is made to flow through inlet leg 18 into the filter housing 12. In the second position, the valve plate 68 abuts the end wall of bore 64, blocking the port 72.

Turning now to the filter cartridge housing 12, it has a cylindrical shell configuration with a slightly rounded top and an open bottom. The housing is internally threaded, as at 52, for cooperating with threads 50 located on the exterior of the outer rim 38 of the base member 16. When the filter cartridge housing 12 and base 16 are screwed together, a gasket 82 encircles the exterior at the connection of the base 16 and filter cartridge housing 12 to prevent any leakage.

The filter cartridge 14 (FIG. 4) has a generally cylindrical shape and is dimensioned to fit within housing 12. Its upper base is enclosed by a circular cap and its lower base has a cylindrical recess 84. This recess defines the filter cartridge's exit. The cylindrical recess has a diameter which is less than the diameter of the annular wall 46. The filter cartridge contains three filter elements, the first being a carbon block filter 86. This surrounds a lead and mercury removing resin 88. The final filter 90 surrounds the filter's circular recess 84. As is shown, the filter cartridge rests on the base 16 with recess 84 located just above the zone surrounded by the annular wall 46. An annular gasket 92 is placed between the upper rim of the annular wall and the base of the filter cartridge. When the housing cover 12 is screwed down, it compresses the cartridge against the gasket which creates a seal between unfiltered water entering the filter housing from hollow leg 18 and water exiting the filter cartridge into the interior zone of annular wall 46.

OPERATION OF THE DEVICE

The invention is mounted onto the faucet by having the faucet's spout straddled by the two legs 18 and 20 and with the threaded attachment ring 34 screwed onto the conventionally threaded end of a kitchen faucet. The user may now select between filtered and unfiltered water using valve actuator knob 32.

Unfiltered water is obtained when the faucet is turned on and knob 32 is not manipulated. In this position, spring 70 will cause the valve plate 68 abut and block the end of bore 64, thereby preventing water flow through tube 76 into the filter housing. The water will instead pass through faucet spout attachment 34 into upper vertical channel 61 and will flow through horizontal bore 64 and the second portion 62 of the vertical channel, thereby entering aerator 60 and exiting at unfiltered water exit 58.

Filtered water is obtained by pulling the valve knob 32 away from the cylindrical socket 28 against the force of spring 70. This action will cause the valve 68 to unseat port 72 and move to a location to block the horizontal channel 64 between vertical bores 61 and 62. Thus, the water will now flow into the horizontal channel 64, through port 72, the tube 76 and will enter the hollow inlet leg 18 of the base 16. Once in the inlet leg 18, the water will flow upward through the hollow leg into the filter cartridge housing 12 where it surrounds the filter cartridge 14. The increase of water in the filter cartridge housing 12 creates a pressure forcing the water through the filter cartridge 14 toward its center. After passing through the carbon block filter 86 and lead/mercury removing resin 88, the water is forced into the final filter 90. After exiting the final filter 90, the water enters the interior of the annular wall 46. The annular gasket 92, placed between the annular wall 46 and filter cartridge 14, creates a seal to ensure no mixing between filtered and unfiltered water. The filtered water flows through the small port 48 (FIG. 4) down the hollow outlet leg 20 and exits through the filtered water exit 80 at the lower end of outlet leg 20.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A faucet mounted water filter assembly for selecting between filtered and unfiltered water, said purifier comprising:
   (a) a filter cartridge housing having a cylindrical shell configuration, said housing containing a filter cartridge therein, said filter cartridge having a filter exit;
   (b) a base having an inlet for unfiltered water, an outlet for filtered water, first and second tubular legs projecting below said base, said first leg in fluid communication with the said inlet and having a lower end, said second leg in fluid communication with said outlet and having a lower end;
   (c) means on said base for sealing said outlet from said inlet;
   (d) a diverter valve support disposed between said lower ends of said tubular legs and connected thereto, said diverter valve support having a valve receiving socket therein; and
   (e) a diverter valve received by said socket, said diverter valve having a faucet spout attachment, an unfiltered water exit port, a water outlet port, means to fluidly connect said water outlet port to said first tubular leg and a activator valve for selectively blocking and unblocking said water outlet port to cause water to flow through said unfiltered water exit and through said first tubular leg into said cartridge housing, respectively.

2. A faucet mounted water filter assembly as in claim 1 wherein said base comprises:
   (a) a planar surface;
   (b) an annular wall extending from said planar surface centrally thereof, said unfiltered water inlet being located in said planar surface exterior of said annular wall, said filtered water outlet being located interior of said annular wall; and
   (c) an annular gasket disposed between said annular wall and said filter exit.

3. A faucet mounted water filter assembly as in claim 1 wherein said means to fluidly connect is a tube.

4. A faucet mounted water filter assembly of claim 1 wherein said base further includes an annular rim having a threaded surface, said cylindrical shell having an open end with threads disposed thereon for engaging with said threads on said annular rim.

5. The faucet mounted water filter assembly of claim 1 wherein said tubular legs are in parallel spaced apart relation and depend sufficiently from said base to allow a conventional faucet spout to pass therebetween.

6. A faucet mounted water filter assembly of claim 1 wherein said filter cartridge is cylindrical, having upper and lower bases and a ring of carbon block filter material surrounding a lead removing resin and a final filter centrally located on said lower base, said final filter being in fluid communication with said filter exit when said filter cartridge is disposed in said housing.

7. The faucet mounted water filter assembly of claim 1 and further including aerator means attached to said diverter valve for introducing air into the water stream exiting said unfiltered water exit port.

* * * * *